United States Patent
Kung

(10) Patent No.: US 9,921,700 B2
(45) Date of Patent: Mar. 20, 2018

(54) DISPLAY MODULE WITH PRESSURE SENSOR

(71) Applicant: FocalTech Electronics, Ltd., Grand Cayman (KY)

(72) Inventor: Chen-Pang Kung, Hsinchu County (TW)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 41 days.

(21) Appl. No.: 14/987,996

(22) Filed: Jan. 5, 2016

(65) Prior Publication Data

US 2017/0031476 A1 Feb. 2, 2017

(30) Foreign Application Priority Data

Jul. 29, 2015 (CN) .......................... 2015 1 0455178

(51) Int. Cl.
*G06F 3/044* (2006.01)

(52) U.S. Cl.
CPC .................................. *G06F 3/044* (2013.01)

(58) Field of Classification Search
CPC ....................................................... G06F 3/044
See application file for complete search history.

(56) References Cited

U.S. PATENT DOCUMENTS

| | | | | |
|---|---|---|---|---|
| 6,002,389 | A * | 12/1999 | Kasser | G06F 3/041 178/18.01 |
| 8,669,952 | B2 | 3/2014 | Hashimura et al. | |
| 8,736,574 | B2 | 5/2014 | Dietz et al. | |
| 2011/0057904 | A1 * | 3/2011 | Yamano | G06F 3/0414 345/174 |
| 2013/0082970 | A1 * | 4/2013 | Frey | G06F 3/0414 345/173 |
| 2015/0193043 | A1 * | 7/2015 | Yang | G06F 3/044 345/174 |
| 2015/0277648 | A1 * | 10/2015 | Small | G06F 3/0416 345/174 |
| 2016/0088133 | A1 * | 3/2016 | Kim | G06F 1/1643 345/174 |
| 2016/0098131 | A1 * | 4/2016 | Ogata | G06F 3/0414 345/173 |

(Continued)

FOREIGN PATENT DOCUMENTS

WO   WO 2015041268 A1 * 3/2015 ........... G06F 3/0414

*Primary Examiner* — Latanya Bibbins
(74) *Attorney, Agent, or Firm* — WPAT, PC

(57) ABSTRACT

A display module includes a front panel, a backlight panel, a pressure sensor and a panel frame. The front panel includes an array of display pixels. The backlight panel is disposed under the front panel. The pressure sensor is disposed under the backlight panel, and includes a top electrode layer, an interlayer and a bottom electrode layer. The bottom electrode layer includes plural sub-electrodes. If a first distance between a first sub-electrode and a geometric center of the bottom electrode layer is shorter than a second distance between a second sub-electrode and the geometric center, an area of the second sub-electrode is larger than an area of the first sub-electrode. The panel frame is disposed under the pressure sensor. When an applied pressure is received by the front panel, a magnitude of the applied pressure is sensed by the pressure sensor.

11 Claims, 8 Drawing Sheets

(56) References Cited

U.S. PATENT DOCUMENTS

2016/0103544 A1* 4/2016 Filiz ..................... G06F 3/0414
 345/174
2016/0170543 A1* 6/2016 Kawamura ......... G06F 3/03547
 345/174

* cited by examiner

DISPLAY MODULE WITH PRESSURE SENSOR

This application claims the benefit of People's Republic of China Patent Application No. 201510455178.X, filed Jul. 29, 2015, the subject matter of which is incorporated herein by reference.

FIELD OF THE INVENTION

The present invention relates to a display module, and more particularly to a display module with a pressure sensor.

BACKGROUND OF THE INVENTION

FIGS. 1A~1D are schematic views illustrating a conventional pressure sensor and a display module with the pressure sensor. The pressure sensor is disclosed in U.S. Pat. No. 8,669,952.

As shown in FIG. 1A, the pressure sensor 100 comprises a sealed chamber 102, a top surface 104, a first electrode 106, a second electrode 108 and a bottom surface 118. An elastic polymer medium 110 with distributed metallic nanoparticles 112 is filled in the sealed chamber 102. The first electrode 106 is formed on the top surface 104. The second electrode 108 is formed on the bottom surface 118. Moreover, the first electrode 106 and the second electrode 108 are transparent electrodes such as indium tin oxide (ITO) electrodes.

Please refer to FIG. 1B. In response to an applied pressure 116 on the top surface 104, the distance between the first electrode 106 and the second electrode 108 is decreased and the elastic polymer medium 110 is compressed. That is, the distance between the metallic nanoparticles 112 is changed in response to an applied pressure 116 on the top surface 104. As the applied pressure is increased, the distance between the metallic nanoparticles 112 is decreased. Consequently, the electrical resistance between the first electrode 106 and the second electrode 108 is decreased.

In case that no pressure is applied to the pressure sensor 100 (see FIG. 1A), the electrical resistance between the first electrode 106 and the second electrode 108 is R1. In case that the pressure 116 is applied to the pressure sensor 100 (see FIG. 1B), the electrical resistance between the first electrode 106 and the second electrode 108 is R2, wherein R1>R2.

FIG. 1C is a schematic top view illustrating a display module with the pressure sensor. FIG. 1D is a schematic cross-sectional view illustrating the display module of FIG. 1C and taken along the line 2B. The display module 200 comprises a front panel 201 with an array of display pixels 202, a backlight panel 204 underlying the front panel 201, and a touchscreen 206 overlying the front panel 201. The touchscreen 206 comprises an array of pressure sensor cells 100. The pressure sensor cell 100mn is also referred as a sensing node.

Generally, each of the pressure sensor cells 100 has the structure as shown in FIG. 1A. Take the pressure sensor cell 100mn as an example. The pressure sensor cell 100mn comprises a sealed chamber, a top surface, a first electrode 106n, a second electrode 108a and a bottom surface. As shown in FIG. 10, the relationship between the input and the output can be used to judge which pressure sensor cell receives the applied pressure. Moreover, the magnitude of the pressure applied to the pressure sensor cell can be determined according to the electrical resistance between a first electrode and a second electrode.

FIGS. 2A~2D are schematic views illustrating a conventional pressure-sensitive cell. The pressure-sensitive cell is disclosed in U.S. Pat. No. 8,736,574.

As shown in FIG. 2A, a matrix 300 comprises plural pressure-sensitive cells. The electrical resistance of the pressure-sensitive cell is changed according to the amount of force applied thereto. Generally, the electrical resistance of the pressure-sensitive cell is in reverse proportion to the amount of force applied thereto.

The matrix 300 has a first layer 322 including plural column conductors 324. The matrix 300 also has a second layer 326 including plural row conductors 328. The second layer 326 is made of a flexible material. When a force is applied to the second layer 326, the second layer 326 is temporarily subjected to deformation.

As shown in FIG. 2B, each intersection of a column conductor 324 on the first layer 322 and a row conductor 328 on the second layer 326 establishes a pressure-sensitive cell 336. The pressure-sensitive cell 336 further comprises a force-sensitive resistive material 338. The column conductor 324 and the row conductor 328 are covered by the force-sensitive resistive material 338.

Generally, if no force is applied to the pressure-sensitive cell 336, the force-sensitive resistive material 338 on the column conductor 324 and the force-sensitive resistive material 338 on the row conductor 328 are not in contact with each other. If the force applied to the pressure-sensitive cell 336 exceeds a smallest threshold force, the force-sensitive resistive material 338 on the column conductor 324 and the force-sensitive resistive material 338 on the row conductor 328 are in contact with each other.

For achieving the above purposes, as shown in FIG. 2C, the pressure-sensitive cell 336 further comprises islands 374 and lands 375. The islands 374 and the lands 375 are disposed on the first layer 322 and the second layer 326, respectively. Moreover, the column conductors 324 and the row conductors 328 are electrically isolated by spacers 344. Consequently, if no force is applied to the pressure-sensitive cell 336, the force-sensitive resistive material 338 on the column conductor 324 and the force-sensitive resistive material 338 on the row conductor 328 are not in contact with each other.

The pressure-sensitive cell 336 further comprises a force-spreading layer 346. The force-spreading layer 346 is used for diffusing the force of the touch input to two or more pressure-sensitive cells within matrix 320. The force-spreading layer 346 comprises bumps 348. The bumps 348 are in contact with the second layer 326. Consequently, when a force is applied to the force-spreading layer 346, the force is transferred to the second layer 326 through the bump 348. The force-spreading layer 346 further comprises troughs 78. The troughs 78 are arranged between the bumps and aligned with the corresponding islands 374 and the corresponding lands 375.

Please refer to FIG. 2D. When a force is applied to a contact area 350 of the matrix 320, the force-spreading layer 346 is subjected to deformation. Consequently, the bumps 348 and 347 are in contact with the second layer 325, and the force is transferred to the pressure-sensitive cells 352, 353 and 354 of the matrix 320. Under this circumstance, the force-sensitive resistive material 338 on the second layer 326 and the force-sensitive resistive material 338 on the first layer 322 at the locations 356, 357 and 358 of the pressure-sensitive cells 352, 353 and 354 are in contact with each other. Consequently, the electrical resistances of the pressure-sensitive cells 352, 353 and 354 are decreased. Moreover, since the islands 374 and the lands 375 are separated from each other by the spacers 344, the force-sensitive resistive material 338 on the second layer 326 and the force-sensitive resistive material 338 on the first layer 322 at the locations corresponding to the islands 374 and the lands 375 are not in contact with each other.

From the above discussions, the conventional pressure sensors are disposed over a LCD display module, or disposed over an AMOLED display module, or installed in an outer frame of the display module, or integrated into the LCD pixels. However, regardless of the configurations of the pressure sensors, the pressure sensors are disposed over the backlight panel. In such configuration, the illuminance of the display module is reduced. Moreover, since the structures of the conventional pressure sensors are complicated, the process yield of the display module is impaired.

SUMMARY OF THE INVENTION

The present invention provides a display module with a pressure sensor. The areas of the sub-electrodes of the bottom electrode layer of the pressure sensor are elaborately designed. Consequently, the magnitude of the applied pressure on the display module can be precisely calculated.

An embodiment of the present invention provides a display module. The display module includes a front panel, a backlight panel, a pressure sensor and a panel frame. The front panel includes an array of display pixels. The backlight panel is disposed under the front panel. The pressure sensor is disposed under the backlight panel, and includes a top electrode layer, an interlayer and a bottom electrode layer. The bottom electrode layer includes plural sub-electrodes. If a first distance between a first sub-electrode of the plural sub-electrodes and a geometric center of the bottom electrode layer is shorter than a second distance between a second sub-electrode of the plural sub-electrodes and the geometric center, an area of the second sub-electrode is larger than an area of the first sub-electrode. The panel frame is disposed under the pressure sensor. When an applied pressure is received by the front panel, a magnitude of the applied pressure is sensed by the pressure sensor.

Another embodiment of the present invention provides a display module. The display module includes an illumination module, a pressure sensor and a panel frame. The illumination module includes a top electrode layer. The pressure sensor includes the top electrode layer, an interlayer and a bottom electrode layer. The bottom electrode layer includes plural sub-electrodes. If a first distance between a first sub-electrode of the plural sub-electrodes and a geometric center of the bottom electrode layer is shorter than a second distance between a second sub-electrode of the plural sub-electrodes and the geometric center, an area of the second sub-electrode is larger than an area of the first sub-electrode. The panel frame is disposed under the pressure sensor. When an applied pressure is received by the front panel, a magnitude of the applied pressure is sensed by the pressure sensor.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
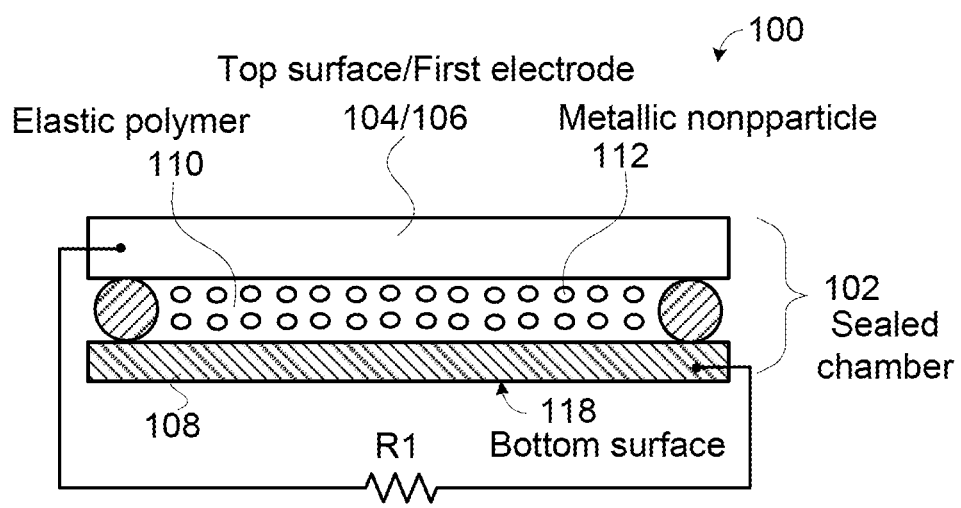
FIGS. 1A~1D (prior art) are schematic views illustrating a conventional pressure sensor and a display module with the pressure sensor.
Figure 1B:
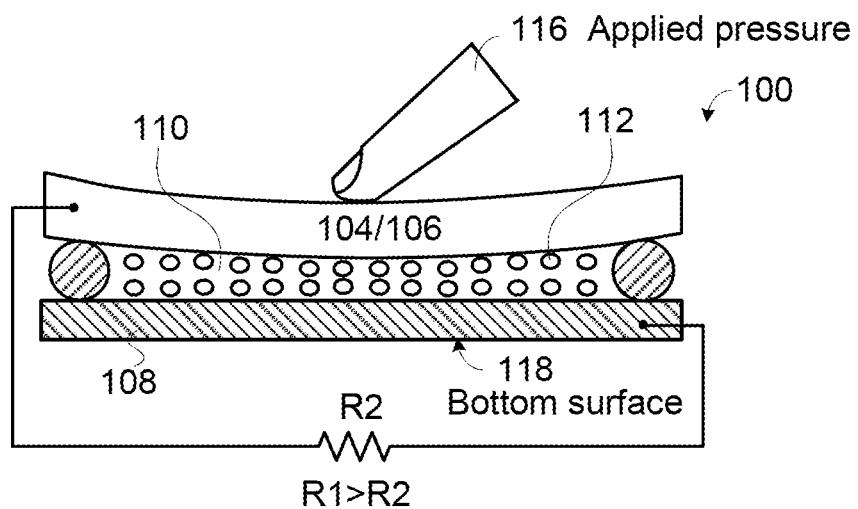
Figure 1C:
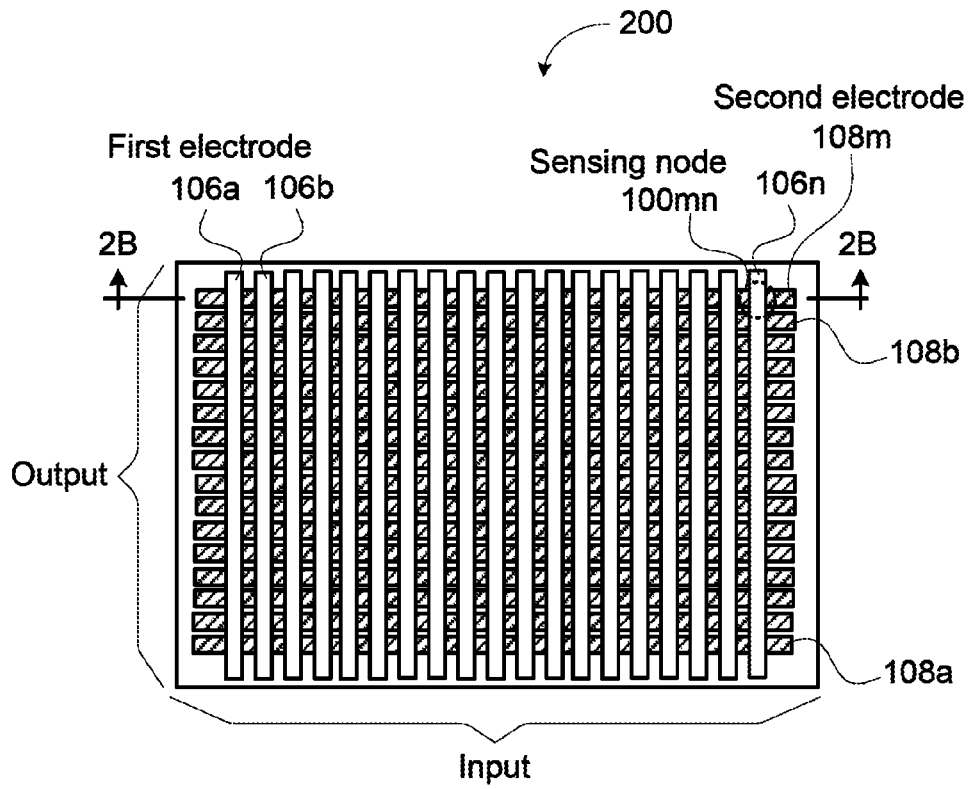
Figure 1D:
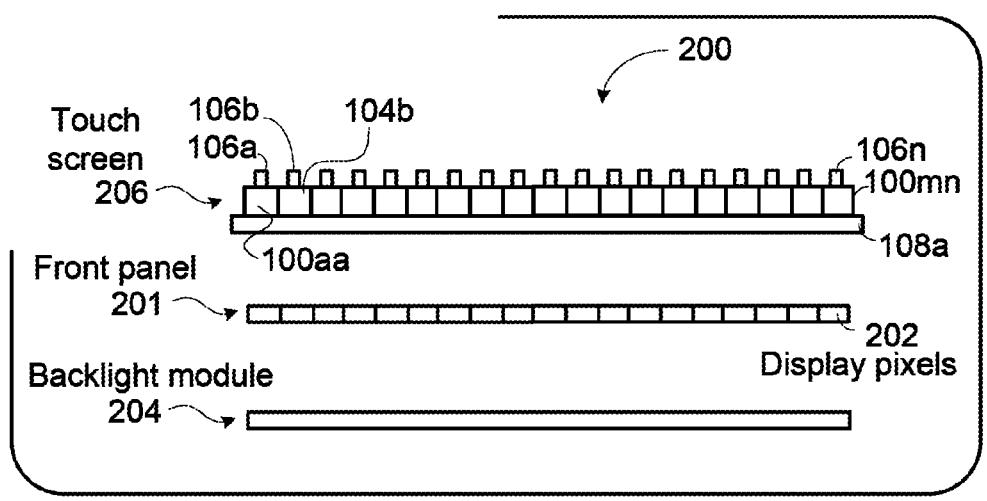
Figure 2A:
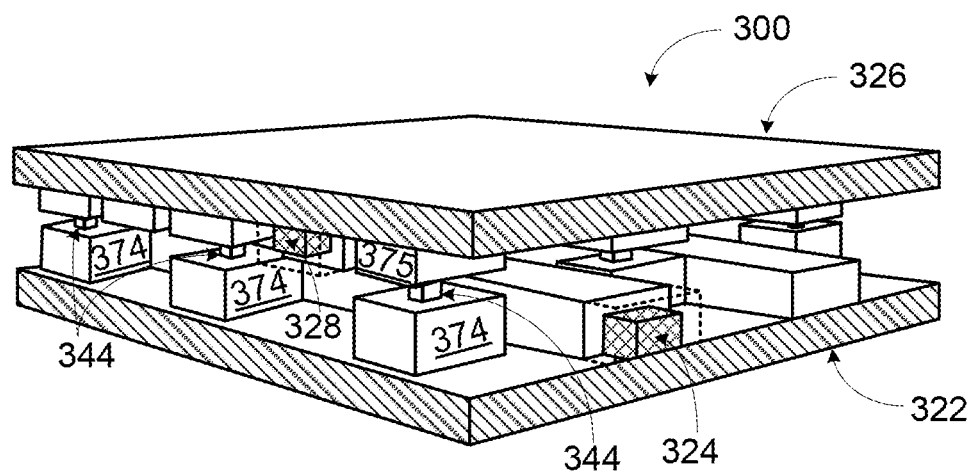
FIGS. 2A~2D (prior art) are schematic views illustrating a conventional pressure-sensitive cell.
Figure 2B:
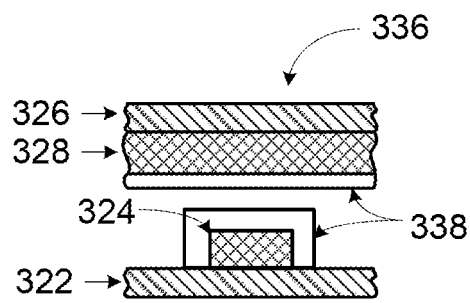
Figure 2C:
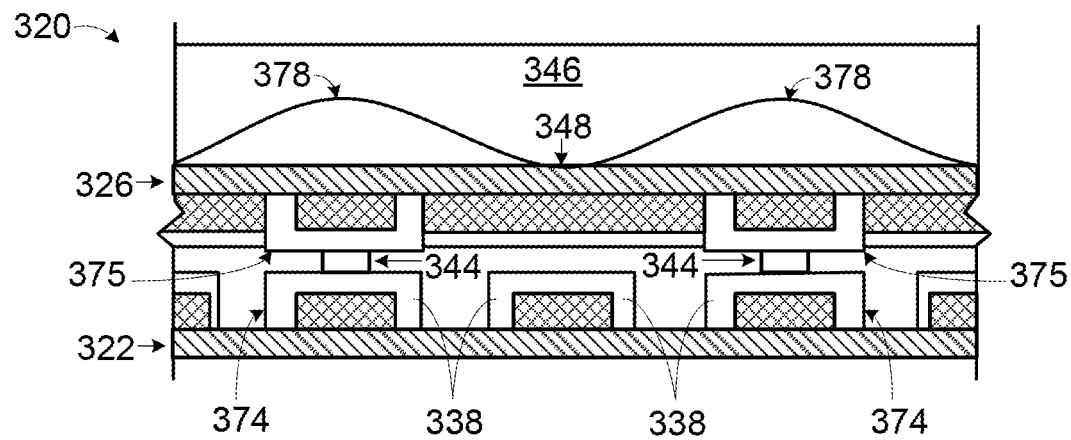
Figure 2D:
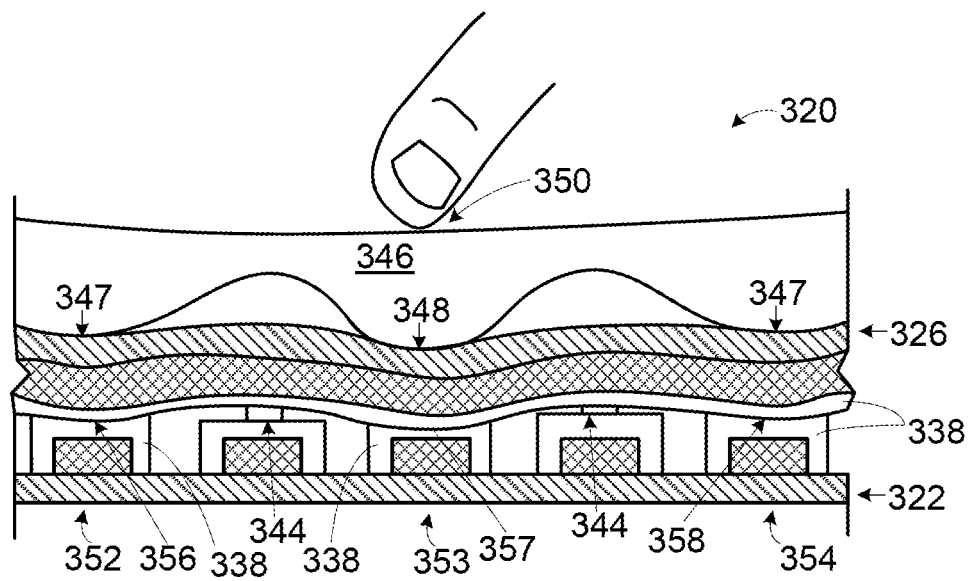
Figure 3A:
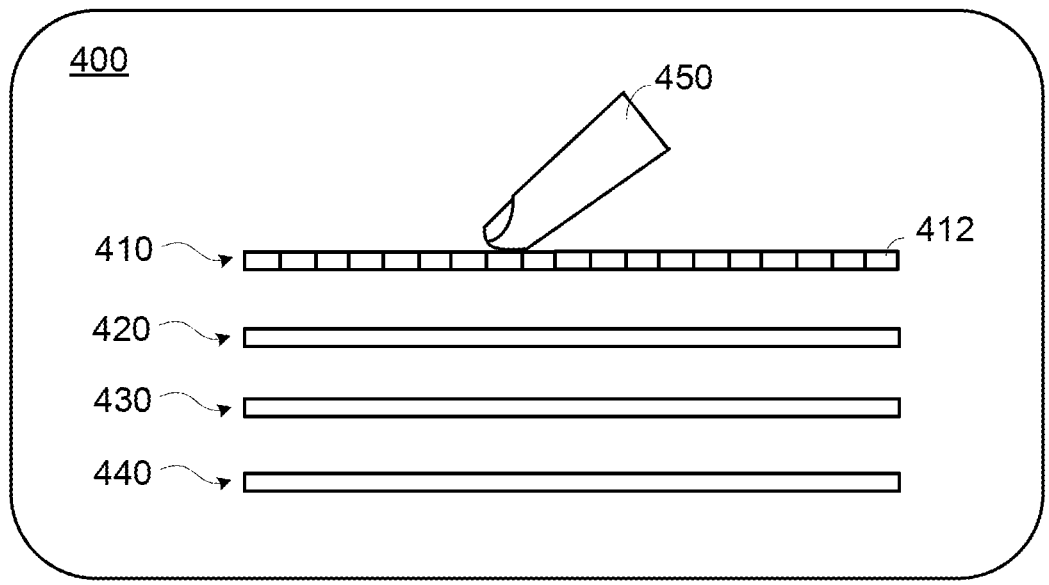
FIG. 3A is a schematic view illustrating a display module with a pressure sensor according to an embodiment of the present invention.

FIG. 3A is a schematic view illustrating a display module with a pressure sensor according to an embodiment of the present invention. As shown in FIG. 3A, the display module 400 at least comprises a panel frame 440, a pressure sensor 430, a backlight panel 420 and a front panel 410, which are arranged in a stack form. The front panel 410 comprises an array of display pixels 412. The front panel 410 further comprises a touch control layer (not shown). A finger 450 of a user can be placed on the touch control layer of the front panel 410 to perform touch control.

Please refer to FIG. 3A again. The backlight panel 420 is disposed under the front panel 410. The pressure sensor 430 is disposed under the backlight panel 420. The panel frame 440 is disposed under the pressure sensor 430. In an embodiment, the backlight panel 420, the pressure sensor 430 and the pressure sensor 430 are attached on each other. Since the pressure sensor 430 is arranged between the backlight panel 420 and the panel frame 440, the illuminance of the display module 400 is not adversely affected by the pressure sensor 430.

Figure 3B:
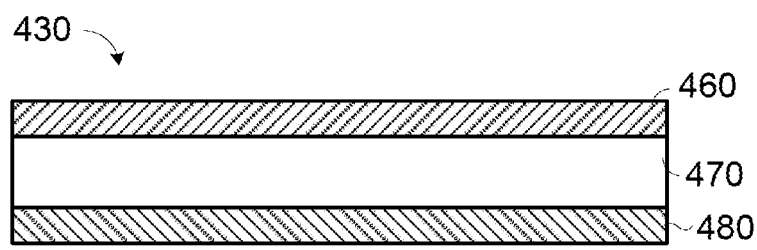
FIG. 3B is a schematic view illustrating the structure of the pressure sensor of the display module of FIG. 3A.

FIG. 3B is a schematic view illustrating the structure of the pressure sensor of the display module of FIG. 3A. The pressure sensor 430 comprises a first substrate 460, an interlayer 470 and a second substrate 480. The interlayer 470 is arranged between the first substrate 460 and the second substrate 480. For example, the interlayer 470 is a dielectric interlayer. Moreover, the first substrate 460 comprises a top electrode layer, and the second substrate 480 comprises a bottom electrode layer. According to a signal change between the top electrode layer and the bottom electrode layer, the pressure sensing operation can be performed.

Figure 3C:
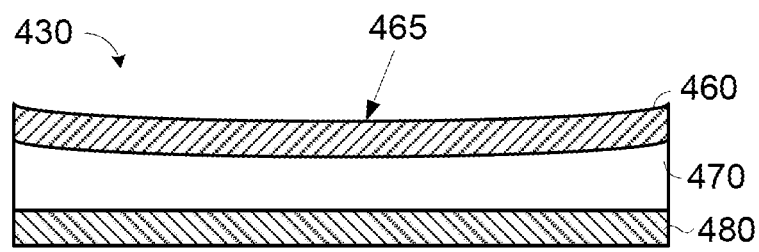
FIG. 3C is a schematic view illustrating the pressure sensor of FIG. 3B in response to an applied pressure.

FIG. 3C is a schematic view illustrating the pressure sensor of FIG. 3B in response to an applied pressure. In this embodiment, the first substrate 460, the interlayer 470 and the second substrate 480 are flexible. Consequently, when the display module 400 receives an applied pressure 465, the applied pressure 465 is transferred to the pressure sensor 430. Under this circumstance, the first substrate 460 is subjected to deformation so as to compress the interlayer 470. Consequently, the magnitude of the applied pressure on the display module 400 is sensed according to a change of a capacitance between the first substrate 460 and the second substrate 480.

In this embodiment, the combination of the front panel 410 and the backlight panel 420 can be considered as an illumination module of the display module 400. Moreover, an example of the illumination module includes but is not limited to a LCD illumination module or an organic light-emitting module. In some embodiments, the first substrate 460 of the pressure sensor 430 is disposed in the illumination module. For example, the first substrate 460 of the pressure sensor 430 is disposed in the backlight panel 420 or the front panel 410.

Moreover, the surface of the display module that is in contact with the finger 450 may be considered as a light-outputting surface of the illumination module. Consequently, the bottom surface of the backlight panel 420 is a backside surface of the illumination module. The backside surface and the light-outputting surface are two opposite surfaces of the illumination module. In addition, the pressure sensor 430 is arranged between the backside surface of the backlight panel 420 and the panel frame 440. Hereinafter, some examples of the display module with the pressure sensor of the present invention will be illustrated.

Figure 4A:
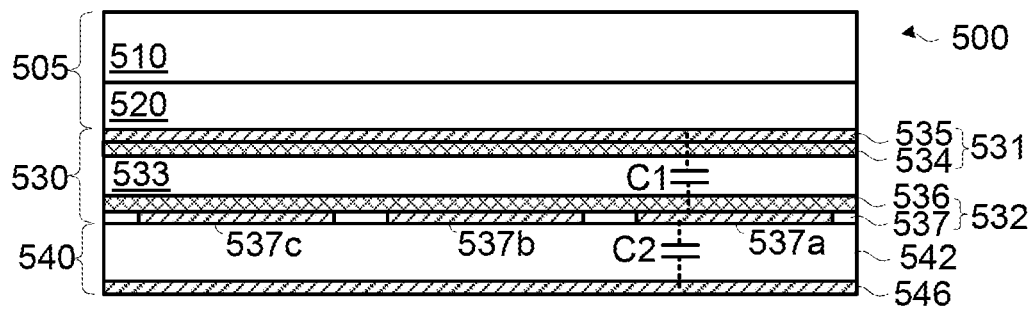
FIG. 4A is a schematic cross-sectional view illustrating a first example of the display module according to the present invention.

FIG. 4A is a schematic cross-sectional view illustrating a first example of the display module according to the present invention. As shown in FIG. 4A, the display module 500 comprises a front panel 510, a backlight panel 520, a pressure sensor 530 and a panel frame 540. The front panel 510 and the backlight panel 520 are combined as an illumination module 505. The panel frame 540 comprises an insulation layer 542 and a metallic frame 546. For example, the insulation layer 542 is made of foam.

The pressure sensor 530 comprises a first substrate 531, an interlayer 532 and a second substrate 533. The first substrate 531 comprises a top substrate 534 and a top electrode layer 535. The second substrate 532 comprises a bottom substrate 536 and a bottom electrode layer 537.

In this embodiment, the bottom electrode layer 537 comprises plural sub-electrodes 537a~537c. Moreover, the top electrode layer 535 and the metallic frame 546 are connected to a ground voltage. Consequently, a first capacitor C1 is formed between each of the sub-electrodes 537a~537c and the top electrode layer 535, and a second capacitor C2 is formed between each of the sub-electrodes 537a~537c and the metallic frame 546.

Please refer to FIG. 4A again. A first capacitor C1 is formed between the sub-electrode 537a and the top electrode layer 535, and a second capacitor C2 is formed between the sub-electrode 537a and the metallic frame 546. Consequently, if no pressure is applied to the display module 500, an equivalent capacitor Ca corresponding to the sub-electrode 537a is equivalent to the first capacitor C1 and the second capacitor C2 in parallel. That is, the capacitance of the equivalent capacitor Ca is equal to the sum of the capacitance of the first capacitor C1 and the capacitance of the second capacitor C2.

Figure 4B:
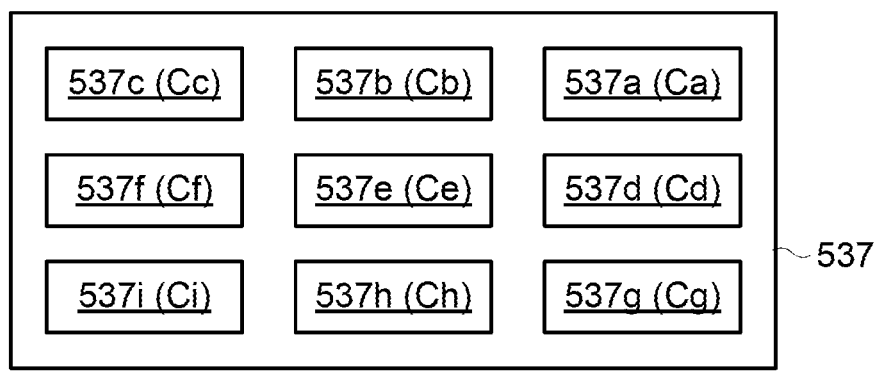
FIG. 4B schematically illustrates the relative locations of some equivalent capacitors corresponding to the sub-electrodes of the bottom electrode layer.
Figure 4C:
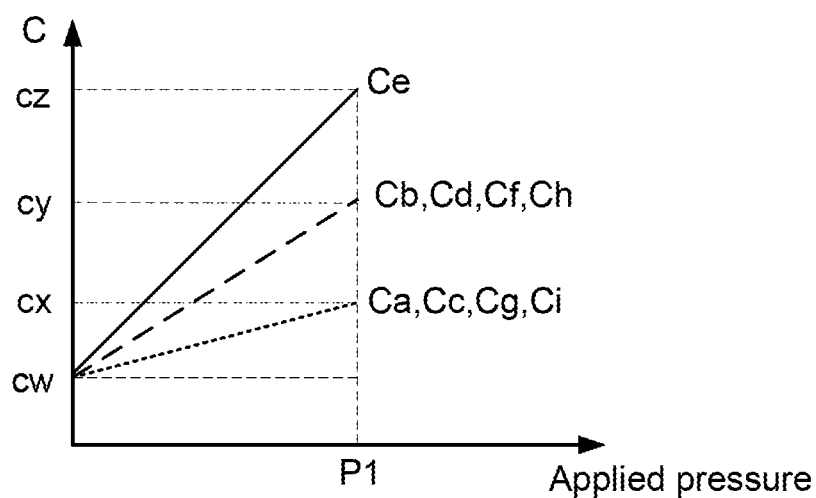
FIG. 4C is a plot illustrating the relationship between the capacitance of the equivalent capacitor and the applied pressure.

FIG. 4B schematically illustrates the relative locations of some equivalent capacitors corresponding to the sub-electrodes of the bottom electrode layer. FIG. 4C is a plot illustrating the relationship between the capacitance of the equivalent capacitor and the applied pressure. For clarification and brevity, the sub-electrodes of the bottom electrode layer are arranged in a 3×3 array. It is noted that the arrangement of the sub-electrodes is not restricted.

As shown in FIG. 4B, the areas of the sub-electrodes 537a-537i of the bottom electrode layer 537 are equal. Generally, the capacitance of the capacitor satisfies the following mathematic formula: $c = \in \times (A/d)$, wherein $\in$ is a dielectric constant, A is an area, and d is the distance between electrode layers. That is, the capacitance is in proportion to the area of the electrode and in inverse proportion to the distance between electrode layers. In other word, if no applied pressure is received by the display module 500, the equivalent capacitors Ca~Ci corresponding to all of the sub-electrodes 537a~537i have the same capacitance cw.

However, because of the characteristics of the display module 500, the sensitivity of the pressure sensor 530 at the center and the sensitivity of the pressure sensor 530 at the edge are different. In case that the magnitudes of the applied pressures received by the sub-electrodes 537a~537i at different locations are equal, the changes of the capacitances of the equivalent capacitors Ca~Ci are not always identical. Please refer to the plot of FIG. 4C. If the magnitude of the applied pressure on the display module 500 is P1, the change of the capacitance of the equivalent capacitor Ce corresponding to the sub-electrode 537e at a geometric center of the bottom electrode layer 537 is the highest (i.e., cz-cw). The change of the capacitance of the equivalent capacitor Cb, Cd, Cf or Ch corresponding to the sub-electrode 537b, 537d, 537f or 537h is the second highest (i.e., cy-cw). The change of the capacitance of the equivalent capacitor Ca, Cc, Cg or Ci corresponding to the sub-electrode 537a, 537c, 537g or 537i is the lowest (i.e., cx-cw).

It is noted that the shape of the bottom electrode layer 537 is not restricted. In the above embodiment, the bottom electrode layer 537 is rectangular. In some other embodiments, the bottom electrode layer has a geometric shape of a circle, a parallelogram, an ellipse or an equilateral polygon.

In response to the applied pressure P1 on the geometric center of the display module 500, the compressive deformation amount is the largest. In response to the applied pressure P1 on a location far from the geometric center of the display module 500, the compressive deformation amount is reduced. In response to the applied pressure P1 on an edge of the display module 500 (i.e., the location farthest from the geometric center of the display module 500), the compressive deformation amount is the smallest. As mentioned above, the capacitance is in inverse proportion to the distance between electrode layers. Since the sub-electrode 537a, 537c, 537g or 537i is at the location farthest from the geometric center of the display module 500, the change of the capacitance of the equivalent capacitor Ca, Cc, Cg or Ci is the lowest. Moreover, the geometric center is a center of gravity.

As mentioned above, the pressure sensor 530 senses the applied pressure of the display module 500 according to the changes of the capacitances of the equivalent capacitors Ca~Ci. Consequently, it is necessary to modify the capacitances of the equivalent capacitors Ca~Ci according to the areas of the sub-electrodes 537a~537i.

Figure 5A:
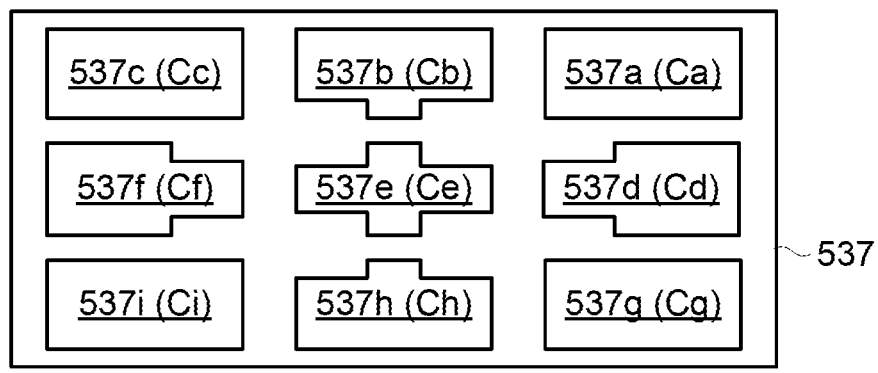
FIG. 5A schematically illustrates the relative locations of some equivalent capacitors corresponding to the sub-electrodes of the bottom electrode layer, in which the areas of the sub-electrodes of the bottom electrode layer are determined according to the distances from the geometric center.
Figure 5B:
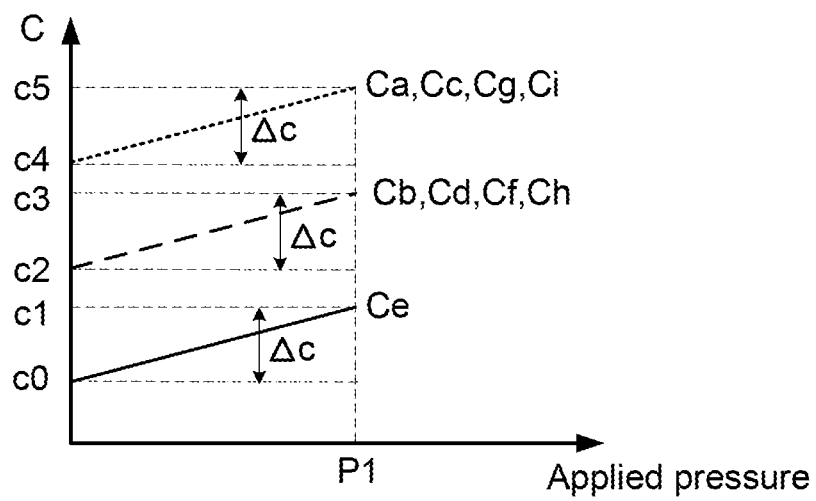
FIG. 5B is a plot illustrating the relationship between the capacitance of the equivalent capacitor and the applied pressure for the bottom electrode layer FIG. 5A.

FIG. 5A schematically illustrates the relative locations of some equivalent capacitors corresponding to the sub-electrodes of the bottom electrode layer, in which the areas of the sub-electrodes of the bottom electrode layer are determined according to the distances from the geometric center. FIG. 5B is a plot illustrating the relationship between the capacitance of the equivalent capacitor and the applied pressure for the bottom electrode layer FIG. 5A. For clarification and brevity, the sub-electrodes of the bottom electrode layer are arranged in a 3×3 array. It is noted that the arrangement of the sub-electrodes is not restricted.

As shown in FIG. 5A, the sub-electrode corresponding to the larger deformation amount has a smaller area, and the sub-electrode corresponding to the smaller deformation amount has a larger area. That is, the sub-electrode at the geometric center has the smallest area, and sub-electrode at the location far from the geometric center has the larger area.

Please refer to FIG. 5A. Among the sub-electrodes 537a-537i of the bottom electrode layer 537, the sub-electrode 537e is at the geometric center of the bottom electrode layer 537. In other words, the sub-electrode 537e has the smallest area. Since the sub-electrodes 537b, 537d, 537f and 537h are farther from the geometric center of the bottom electrode layer 537, the areas of the sub-electrodes 537b, 537d, 537f and 537h are larger than the area of the sub-electrode 537e. Since the sub-electrodes 537a, 537c, 537g and 537i are the farthest from the geometric center of the bottom electrode layer 537, the areas of the sub-electrodes 537a, 537c, 537g and 537i are the largest.

Please refer to the plot of FIG. 5B. if no applied pressure is received by the display module 500, the capacitance of the equivalent capacitor Ce is the lowest (e.g., c0), the capacitance of the equivalent capacitor Cb, Cd, Cf or Ch corresponding to the sub-electrode 537b, 537d, 537f or 537h is higher (e.g., c2), and the capacitance of the equivalent capacitor Ca, Cc, Cg or Ci corresponding to the sub-electrode 537a, 537c, 537g or 537i is the highest (e.g., c4).

By means of the above design, each of the equivalent capacitors Ca~Ci has the same change of capacitance (Δc) in response to the applied pressure P1 on the display module 500. If the magnitude of the applied pressure on the display module 500 is P1, the change of the capacitance of the equivalent capacitor Ce corresponding to the sub-electrode 537e is Δc (=c1−c0). Similarly, the change of the capacitance of the equivalent capacitor Cb, Cd, Cf or Ch corresponding to the sub-electrode 537b, 537d, 537f or 537h is Δc (=c3−c2). Similarly, the change of the capacitance of the equivalent capacitor Ca, Cc, Cg or Ci corresponding to the sub-electrode 537a, 537c, 537g or 537i is Δc (=c5−c4).

From the above descriptions, the capacitances of the equivalent capacitors Ca~Ci are modified according to the areas of the sub-electrodes 537a~537i of the bottom electrode layer 537. Consequently, each of the equivalent capacitors Ca~Ci has the same change of capacitance in response to the same magnitude of the applied pressure. Under this circumstance, the magnitude of the applied pressure on the display module 500 can be precisely calculated.

Figure 6:
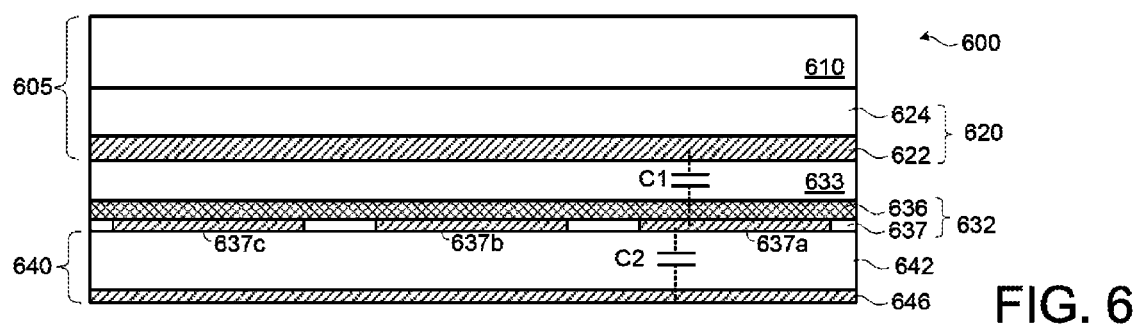
FIG. 6 is a schematic cross-sectional view illustrating a display module according to a second embodiment of the present invention.

FIG. 6 is a schematic cross-sectional view illustrating a display module according to a second embodiment of the present invention. In this embodiment, the top electrode layer of the pressure sensor is integrated into the backlight panel. In other words, the top electrode layer is the existing conductive electrode of the backlight panel.

As shown in FIG. 6, the display module 600 comprises a front panel 610, a backlight panel 620, an interlayer 633, a second substrate 632 and a panel frame 640, which are arranged in a stack form. The front panel 610 and the backlight panel 620 are combined as an illumination module 605 of the display module 600. The panel frame 640 comprises an insulation layer 642 and a metallic frame 646. For example, the insulation layer 642 is made of foam. Moreover, the backlight panel 620 comprises a reflective substrate 622 and a light guide layer 624.

In the display module 600, the pressure sensor is composed of the reflective substrate 622, the interlayer 633 and the second substrate 632. The reflective substrate 622 is the top substrate of the pressure sensor, and is considered as the top electrode layer. Moreover, the second substrate 632 comprises a bottom substrate 636 and a bottom electrode layer 637.

In this embodiment, the bottom electrode layer 637 comprises plural sub-electrodes 637a~637c. Moreover, the reflective substrate 622 and the metallic frame 646 are connected to a ground voltage. Consequently, a first capacitor C1 is formed between each of the sub-electrodes 637a~637c and the reflective substrate 622, and a second capacitor C2 is formed between each of the sub-electrodes 637a~637c and the metallic frame 646.

Please refer to FIG. 6 again. A first capacitor C1 is formed between the sub-electrode 637a and the reflective substrate 622, and a second capacitor C2 is formed between the sub-electrode 637a and the metallic frame 646. Consequently, if no pressure is applied to the display module 600, an equivalent capacitor Ca corresponding to the sub-electrode 637a is equivalent to the first capacitor C1 and the second capacitor C2 in parallel. That is, the capacitance of the equivalent capacitor Ca is equal to the sum of the capacitance of the first capacitor C1 and the capacitance of the second capacitor C2.

Similarly, the capacitances of the equivalent capacitors Ca~Cc are modified according to the areas of the sub-electrodes 637a~637c of the bottom electrode layer 637. Consequently, each of the equivalent capacitors Ca~Cc has the same change of capacitance in response to the same magnitude of the applied pressure. Under this circumstance, the magnitude of the applied pressure on the display module 600 can be precisely calculated.

The concept of designing the areas of the sub-electrodes is similar to the concept of designing the areas of the sub-electrodes as shown in FIG. 5A. That is, the sub-electrode corresponding to the larger deformation amount of the display module 600 has a smaller area, and the sub-electrode corresponding to the smaller deformation amount of the display module 600 has a larger area. That is, the sub-electrode at the geometric center has the smallest area, and sub-electrode at the location far from the geometric center has the larger area.

Figure 7:
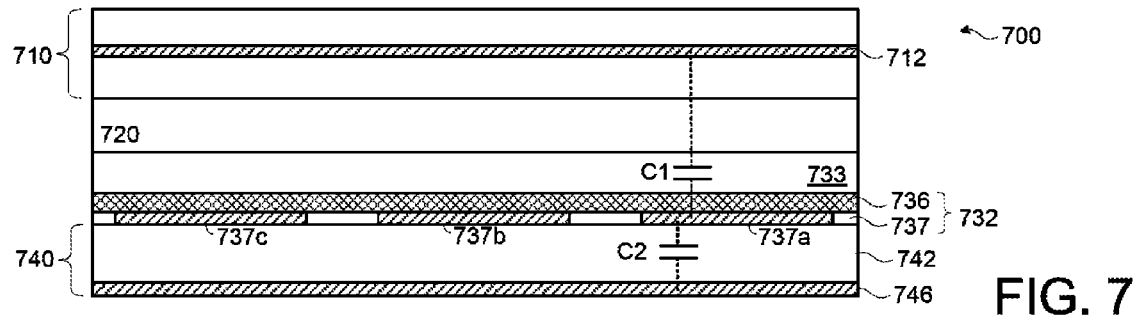
FIG. 7 is a schematic cross-sectional view illustrating a display module according to a third embodiment of the present invention.

FIG. 7 is a schematic cross-sectional view illustrating a display module according to a third embodiment of the present invention. In this embodiment, the top electrode layer of the pressure sensor is integrated into the front panel. In other words, the top electrode layer is the existing conductive electrode of the front panel.

As shown in FIG. 7, the display module 700 comprises a front panel 710, a backlight panel 720, an interlayer 733, a second substrate 732 and a panel frame 740. The front panel 710 and the backlight panel 720 are combined as an illumination module of the display module 700. The panel frame 740 comprises an insulation layer 742 and a metallic frame 746. For example, the insulation layer 742 is made of foam. Moreover, the front panel 710 comprises a transparent electrode layer 712 such as an indium tin oxide (ITO) layer.

In the display module 700, the pressure sensor is composed of the transparent electrode layer 712, the interlayer 733 and the second substrate 732. The transparent electrode layer 712 is the top substrate of the pressure sensor. Moreover, the second substrate 732 comprises a bottom substrate 736 and a bottom electrode layer 737.

In this embodiment, the bottom electrode layer 737 comprises plural sub-electrodes 737a~737c. Moreover, the transparent electrode layer 712 and the metallic frame 746 are connected to a ground voltage. Consequently, a first capacitor C1 is formed between each of the sub-electrodes 737a~737c and the transparent electrode layer 712, and a second capacitor C2 is formed between each of the sub-electrodes 737a~737c and the metallic frame 746.

Please refer to FIG. 7 again. A first capacitor C1 is formed between the sub-electrode 737a and the transparent electrode layer 712, and a second capacitor C2 is formed between the sub-electrode 737a and the metallic frame 746. Consequently, if no pressure is applied to the display module 700, an equivalent capacitor Ca corresponding to the sub-electrode 737a is equivalent to the first capacitor C1 and the second capacitor C2 in parallel. That is, the capacitance of the equivalent capacitor Ca is equal to the sum of the capacitance of the first capacitor C1 and the capacitance of the second capacitor C2.

Similarly, the capacitances of the equivalent capacitors Ca~Cc are modified according to the areas of the sub-electrodes 737a~737c of the bottom electrode layer 737. Consequently, each of the equivalent capacitors Ca~Cc has the same change of capacitance in response to the same magnitude of the applied pressure. Under this circumstance, the magnitude of the applied pressure on the display module 700 can be precisely calculated.

The concept of designing the areas of the sub-electrodes is similar to the concept of designing the areas of the sub-electrodes as shown in FIG. 5A. That is, the sub-electrode corresponding to the larger deformation amount of the display module 700 has a smaller area, and the sub-electrode corresponding to the smaller deformation amount of the display module 700 has a larger area. That is, the sub-electrode at the geometric center has the smallest area, and sub-electrode at the location far from the geometric center has the larger area.

In the above embodiments, the areas of the sub-electrodes of the bottom electrode layer are determined according to the distances of the sub-electrodes from the geometric center. It is noted that the shapes of the sub-electrodes are not restricted. The sub-electrodes may have various shapes such as rectangular shapes, polygonal shapes, circular shapes or hollow circular shapes.

From the above descriptions, the present invention provides a display module with a pressure sensor. Since the pressure sensor is disposed under a backlight panel of the display module, the illuminance of the display module is not adversely affected by the pressure sensor. Moreover, since the areas of the sub-electrodes of the bottom electrode layer are elaborately designed, the magnitude of the applied pressure on the display module can be precisely calculated. For example, the bottom electrode layer of the pressure sensor comprises a first sub-electrode and a second sub-electrode. If a first distance between the first sub-electrode and the geometric center is shorter than a second distance between the second sub-electrode and the geometric center, the area of the second sub-electrode is larger than the area of the first sub-electrode.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display module, comprising:
a front panel comprising an array of display pixels;
a backlight panel disposed under the front panel;
a pressure sensor disposed under the backlight panel and attached on the backlight panel, and the pressure sensor comprising a top electrode layer, an interlayer and a bottom electrode layer, wherein the bottom electrode layer comprises plural sub-electrodes, wherein areas of the sub-electrodes are determined according to distances between the sub-electrodes to a geometric center of the bottom electrode layer; and the sub-electrodes comprise a first sub-electrode, a second sub-electrode and a third sub-electrode, wherein if a first area of the first sub-electrode is smaller than a second area of the second sub-electrode and the second area of the second sub-electrode is smaller than a third area of the third sub-electrode, a first distance between the first sub-electrode and the geometric center is shorter than a second distance between the second sub-electrode and the geometric center, and the second distance between the second sub-electrode and the geometric center is shorter than a third distance between the third sub-electrode and the geometric center; and
a panel frame disposed under the pressure sensor,
wherein when an applied pressure is received by the front panel, a magnitude of the applied pressure is sensed by the pressure sensor.

2. The display module as claimed in claim 1, wherein the pressure sensor further comprises a first substrate and a second substrate, and the interlayer is arranged between the first substrate and the second substrate, wherein the first substrate comprises the top electrode layer, the second substrate comprises the bottom electrode layer, and the interlayer is a dielectric interlayer.

3. The display module as claimed in claim 1, wherein the panel frame comprises an insulation layer and a metallic frame.

4. The display module as claimed in claim 3, wherein the top electrode layer and the metallic frame are connected to a ground voltage.

5. The display module as claimed in claim 3, wherein the insulation layer is made of foam.

6. A display module, comprising:
an illumination module comprising a top electrode layer;
a pressure sensor attached on the backlight panel, and the pressure sensor comprising the top electrode layer, an interlayer and a bottom electrode layer, wherein the bottom electrode layer comprises plural sub-electrodes, wherein areas of the sub-electrodes are determined according to distances between the sub-electrodes to a geometric center of the bottom electrode layer; and the sub-electrodes comprise a first sub-electrode, a second sub-electrode and a third sub-electrode, wherein if a first area of the first sub-electrode is smaller than a second area of the second sub-electrode and the second area of the second sub-electrode is smaller than a third area of the third sub-electrode, a first distance between the first sub-electrode and the geometric center is shorter than a second distance between the second sub-electrode and the geometric center, and the second distance between the second sub-electrode and the geometric center is shorter than a third distance between the third sub-electrode and the geometric center; and a panel frame disposed under the pressure sensor, wherein when an applied pressure is received by the front panel, a magnitude of the applied pressure is sensed by the pressure sensor.

7. The display module as claimed in claim 6, wherein the illumination module comprises:

a front panel comprising an array of display pixels; and a backlight panel disposed under the front panel, wherein the backlight panel comprises a reflective substrate and a light guide layer, and the reflective substrate is used as the top electrode layer of the pressure sensor.

8. The display module as claimed in claim 6, wherein the illumination module comprises:

a front panel comprising an array of display pixels, wherein the front panel further comprises a transparent electrode layer; and a backlight panel disposed under the front panel, wherein the transparent electrode layer is used as the top electrode layer of the pressure sensor.

9. The display module as claimed in claim 6, wherein the panel frame comprises an insulation layer and a metallic frame.

10. The display module as claimed in claim 9, wherein the top electrode layer and the metallic frame are connected to a ground voltage.

11. The display module as claimed in claim 9, wherein the insulation layer is made of foam.

* * * * *